United States Patent
Cho et al.

(10) Patent No.: US 10,627,130 B2
(45) Date of Patent: Apr. 21, 2020

(54) AIR CONDITIONING SYSTEM, INDOOR UNIT OF AIR CONDITIONING SYSTEM AND METHOD FOR CONTROLLING THE SAME

(71) Applicant: Samsung Electronics Co., Ltd., Suwon-si, Gyeonggi-do (KR)

(72) Inventors: Sung-min Cho, Seoul (KR); Yeon-a Hwang, Suwon-si (KR); Jae-sung Kwon, Seoul (KR); Sung-min Yoo, Suwon-si (KR); Ki-sup Lee, Seongnam-si (KR); Il-yong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 15/859,128

(22) Filed: Dec. 29, 2017

(65) Prior Publication Data

US 2018/0209683 A1    Jul. 26, 2018

(30) Foreign Application Priority Data

Jan. 25, 2017  (KR) .......................... 10-2017-0012225
May 19, 2017  (KR) .......................... 10-2017-0062061

(51) Int. Cl.
*F25D 17/00*     (2006.01)
*F24F 11/76*     (2018.01)
(Continued)

(52) U.S. Cl.
CPC ............ *F24F 11/76* (2018.01); *F24F 1/0007* (2013.01); *F24F 11/77* (2018.01); *F24F 1/00* (2013.01); *F24F 2110/10* (2018.01)

(58) Field of Classification Search
CPC .... F24F 1/26; F24F 11/00; F24F 11/76; F24F 11/77; F24F 1/00; F24F 2110/10
(Continued)

(56) References Cited

U.S. PATENT DOCUMENTS 5,735,135 A * 4/1998 Katsuki ..................... F24F 1/26
                                                      62/259.1
7,956,755 B2   6/2011 Lee et al.
(Continued)

FOREIGN PATENT DOCUMENTS

CN    104501371 A    4/2015
CN    104676843 A    6/2015
(Continued)

OTHER PUBLICATIONS

China National Intellectual Property Administration, "The First Office Action," Application No. CN 201810067607.X, dated Nov. 20, 2019, 31 pages.

*Primary Examiner* — Davis D Hwu

(57) ABSTRACT

An indoor unit of an air conditioning system is provided. The indoor unit according to an exemplary embodiment includes a blower fan, a plurality of micro-holes configured to discharge cool air flowed in from the blower fan, a temperature sensor configured to measure a temperature, and a processor configured to control a speed of the blower fan, wherein the processor, in a first mode, controls the speed of the blower fan according to a temperature sensed by the temperature sensor, and in a second mode, corrects the sensed temperature by applying a temperature correction coefficient and controls the speed of the blower fan according to the corrected temperature, and wherein the temperature correction coefficient is a coefficient set for compensating a difference between the sensed temperature and a temperature of a target height.

20 Claims, 10 Drawing Sheets
(1 of 10 Drawing Sheet(s) Filed in Color)

(51) Int. Cl.
*F24F 11/77* (2018.01)
*F24F 1/0007* (2019.01)
*F24F 110/10* (2018.01)
*F24F 1/00* (2019.01)

(58) Field of Classification Search
USPC .................................................. 62/177, 259.1
See application file for complete search history.

(56) References Cited

U.S. PATENT DOCUMENTS

| | | |
|---|---|---|
| 8,474,727 B2 | 7/2013 | Lee et al. |
| 2013/0151019 A1* | 6/2013 | Federspiel ............... F24F 11/00 700/276 |
| 2015/0094865 A1* | 4/2015 | Choi ..................... G06F 3/0488 700/278 |

FOREIGN PATENT DOCUMENTS

| | | |
|---|---|---|
| CN | 104913443 A | 9/2015 |
| CN | 104930644 A | 9/2015 |
| CN | 105042794 A | 11/2015 |
| JP | H04-270843 A | 9/1992 |
| JP | H11223374 A | 8/1999 |
| JP | 3877615 B2 | 2/2007 |
| JP | 2007-212109 A | 8/2007 |
| JP | 2012184900 A | 9/2012 |
| KR | 1995-0014776 A | 6/1995 |
| KR | 1999-0058529 A | 7/1999 |
| KR | 2002-0004464 A | 1/2002 |
| KR | 2003-0032529 A | 4/2003 |
| KR | 10-2004-0067263 A | 7/2004 |
| KR | 20-0362532 Y1 | 9/2004 |
| KR | 10-0791371 B1 | 1/2008 |
| KR | 10-0810510 B1 | 3/2008 |
| KR | 10-1070139 B1 | 10/2011 |
| KR | 10-1248746 B1 | 4/2013 |

* cited by examiner

AIR CONDITIONING SYSTEM, INDOOR UNIT OF AIR CONDITIONING SYSTEM AND METHOD FOR CONTROLLING THE SAME

CROSS-REFERENCE TO RELATED APPLICATIONS AND CLAIM OF PRIORITY

This application is related to and claims priority to Korean Patent Application No. 10-2017-0012225, filed on Jan. 25, 2017 and Korean Patent Application No. 10-2017-0062061, filed on May 19, 2017, the contents of which are incorporated herein by reference.

TECHNICAL FIELD

Devices and methods consistent with what is disclosed herein relate to an air conditioning system, an indoor unit of an air conditioning system and a method for controlling the same, and more particularly, to an air conditioning system capable of saving energy through temperature stratification by controlling airflow due to buoyancy, an indoor unit of an air conditioning system and a method for the same.

BACKGROUND

An air conditioner is a device that is placed in a house, an office, a shop, a green house, or the like and maintains indoor environment to be comfortable for people to live or to be suitable for growing crops by adjusting temperature, humidity, cleanliness and airflow.

Particularly, an indoor temperature is a key factor of conditions for a comfortable sleep. Most sleep algorithms are configured to control an indoor temperature and maintain an adequate indoor temperature for user's comfortable sleep. The sleep algorithm applied to the conventional air conditioner has a temperature control algorithm applicable to most people by static analysis. To be specific, the sleep algorithm has a sleep entrance mode to keep a temperature down for helping a user to get into sleep quickly at the early stage, a comfortable sleep temperature mode for helping the user to get into deep sleep and a wake-up mode for helping the user to wake up. According to the conventional technology, the sleep algorithm is implemented by controlling airflow for uniformly air conditioning an entire area using a conventional mixing system.

However, the electric charge for using an air conditioner is overwhelmingly expensive for those who use it in hot summer, especially when tropical nights last. The conventional technology has an energy reduction effect compared to a fixed temperature air conditioning operation in terms of temperature algorithm, but also consumes unnecessary energy for air conditioning even an area where a user does not stay (an area above 1 m height). To be specific, the conventional technology has the problem of consuming additional energy by uniformly air conditioning an area from 0 to 2 m height within a temperature variation of 3° C., particularly, air conditioning an area where a user does not stay for a sleep.

SUMMARY

To address the above-discussed deficiencies, it is a primary object to provide an air conditioning system capable of saving energy through temperature stratification by controlling airflow due to buoyancy, an indoor unit of an air conditioning system and a method for the same.

According to an exemplary embodiment, there is provided an indoor unit of an air conditioning system including a blower fan, a plurality of micro-holes configured to discharge cool air flowed in from the blower fan, a temperature sensor configured to measure a temperature, and a processor configured to control a speed of the blower fan, wherein the processor, in a first mode, controls the speed of the blower fan according to a temperature sensed by the temperature sensor, and in a second mode, corrects the sensed temperature by applying a temperature correction coefficient and controls the speed of the blower fan according to the corrected temperature, and wherein the temperature correction coefficient is a coefficient set for compensating a difference between the sensed temperature and a temperature of a target height.

The temperature correction coefficient may have a value in a range from −4° C. to 0° C.

The indoor unit may further include a communicator wherein the processor, in the second mode, transmits an operation command with regard to a compressor to an outdoor unit through the communicator to discharge cool air at a lower temperature than cool air discharged in the first mode.

The indoor unit may further include a cover configured to be selectively opened and closed and to be arranged in a cool air outlet which discharges the cool air flowed in from the blower fan to an outside in an open state, wherein the processor controls to discharge the cool air flowed in from the blower fan at a predetermined flow rate or less through the plurality of micro-holes by closing the cover in a no-wind mode and to discharge the cool air flowed in from the blower fan to the outside by opening the cover in a wind mode.

The processor may adjust the speed of the blower fan based on a difference between the corrected temperature and a set temperature in the second mode.

The processor may change the set temperature at every predetermined period of time in the second mode.

The indoor unit may further include a communicator configured to receive operation information with regard to a compressor included in an outdoor unit, wherein the processor increases the speed of the blower fan in response to the compressor operating.

According to an exemplary embodiment, there is provided a controlling method for an indoor unit of an air conditioning system, the method may include sensing a temperature, in a first mode, determining a speed of a blower fan according to the sensed temperature, and, in a second mode, applying a temperature correction coefficient, correcting the sensed temperature and determining the speed of the blower fan according to the corrected temperature, and discharging cool air by driving the blower fan at the determined speed, wherein the temperature correction coefficient is a coefficient set for compensating a difference between the sensed temperature and a temperature of a target height.

The temperature correction coefficient may have a value in a range from −4° C. to 0° C.

The method may further include in the second mode, transmitting an operation command for controlling a compressor to an outdoor unit including the compressor to discharge cool air at a lower temperature than cool air discharged in the first mode.

The discharging of the cool air may include in a no-wind mode, closing a cover provided in a cool air outlet of the indoor unit and discharging cool air flowed in from the blower fan through a plurality of micro-holes formed in the cover, and in a wind mode, opening the cover and discharging the cool air flowed in from the blower fan through the cool air outlet.

The determining the speed of the blower fan may include adjusting the speed of the blower fan based on a difference between the corrected temperature and a set temperature in the second mode.

The set temperature may be changed at every predetermined period of time in the second mode.

The method may further include receiving operation information with regard to a compressor included in an outdoor unit, wherein the determining of the speed of the blower fan comprises increasing the speed of the blower fan in response to the compressor operating.

According to an exemplary embodiment, there is provided an air conditioning system including an outdoor unit, and an indoor unit configured to generate cool air by using a refrigerant supplied from the outdoor unit and discharge the generated cool air through a blower fan, wherein the indoor unit, in a first mode, controls a speed of the blower fan according to a sensed temperature, and in a second mode, applies a temperature correction coefficient, corrects the sensed temperature and controls the speed of the blower fan according to the corrected temperature, and wherein the temperature correction coefficient is a coefficient set for compensating a difference between the sensed temperature and a temperature of a target height.

According to the above-described various exemplary embodiments, a channel list for broadcast programs which are expected to be viewed by a user at a time when a predetermined event occurs in the display apparatus is provided and thus, the user may be provided with a more effective channel list.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure and its advantages, reference is now made to the following description taken in conjunction with the accompanying drawings, in which like reference numerals represent like parts.

DETAILED DESCRIPTION

Figure 1:
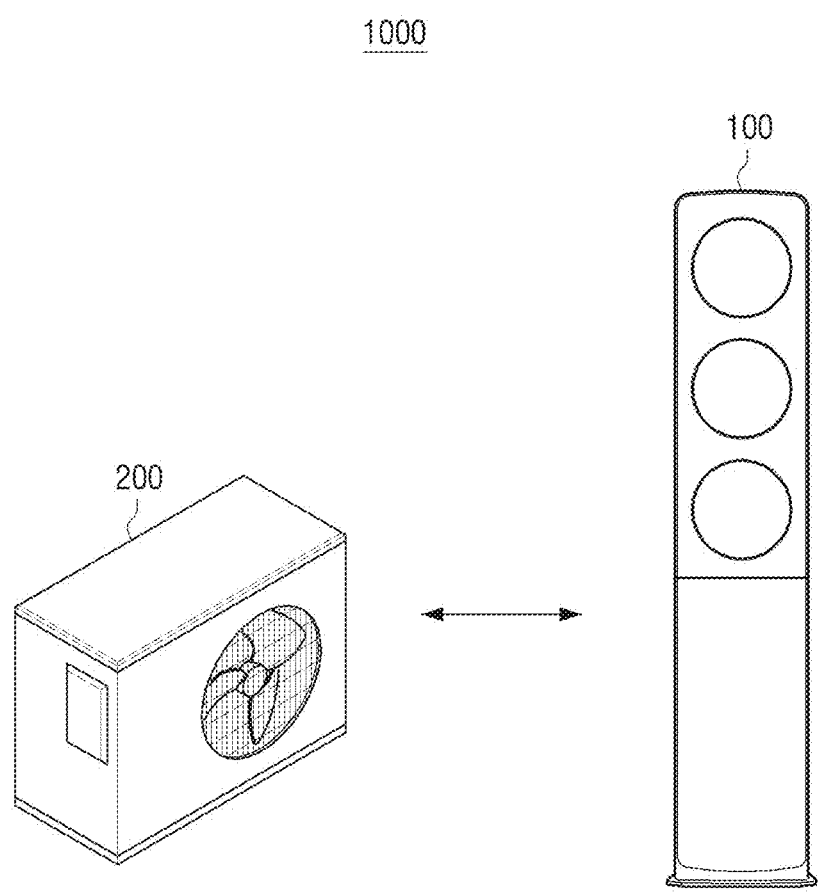
FIG. 1 is a view illustrating an air conditioning system according to an exemplary embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in this specification will be briefly described, and the present disclosure will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

In other words, the disclosure is not limited to an embodiment disclosed below and may be implemented in various forms and the scope of the disclosure is not limited to the following embodiments. In addition, all changes or modifications derived from the meaning and scope of the claims and their equivalents should be construed as being included within the scope of the present disclosure. In the following description, the configuration which is publicly known but irrelevant to the gist of the present disclosure could be omitted.

The terms such as "first," "second," and so on may be used to describe a variety of elements, but the elements should not be limited by these terms. The terms are used simply to distinguish one element from other elements.

The terms used in the application are merely used to describe particular exemplary embodiments, and are not intended to limit the disclosure. Singular forms in the disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module and may be realized as at least one processor except for 'modules', 'units' or 'parts' that should be realized in a specific hardware.

Hereinafter, embodiments will be described in greater detail with reference to the accompanying drawings. A thickness and spacing are presented for convenience of explanation, and could be exaggerated compared to an actual physical thickness. In the following description, the configuration which is publicly known but irrelevant to the gist of the present disclosure could be omitted. In addition, with regard to adding the reference numerals to constituent elements of each drawing, it should be noted that like reference numerals in the drawings denote like elements even though shown on the other drawings.

FIG. 1 is a view illustrating an air conditioning system according to an exemplary embodiment of the present disclosure.

Referring to FIG. 1, an air conditioning system 1000 may include an indoor unit 100 and an outdoor unit 200.

The indoor unit 100 may be connected to the outdoor unit 200. Specifically, the indoor unit 100 may exchange a refrigerant with the outdoor unit 200. The indoor unit 100 may be connected to the outdoor unit 200 through a pipe for exchanging the refrigerant. According to an embodiment, it is illustrated and describes that a single indoor unit is connected to an outdoor unit, but when embodying an actual system, a plurality of indoor units may be connected to an indoor unit, and in this case, each of the indoor units may be connected to an outdoor unit in parallel through a pipe, or all indoor units and an outdoor unit may be connected through a single pipe in a circulating form.

The indoor unit 100 may transmit to or receive from information for performing an air conditioning operation with the outdoor unit 200. The indoor unit 100 may be arranged indoors and perform an air conditioning operation for indoor air. Specifically, the indoor unit 100 may perform at least one of air conditioning operations such as a cooling operation for reducing a temperature of the indoor air, a heating operation for raising the temperature of the indoor air, a blowing operation for generating airflow inside and a dehumidifying operation for reducing an indoor humidity.

The indoor unit 100 may selectively operate in one of a plurality of operation modes. Specifically, the indoor unit 100 may operate in a normal mode or in a sleep mode according to an operation time zone. In addition, there may be two types of operation mode, a wind-mode and a no-wind mode, according to whether air is directly discharged using a blower fan.

The normal mode may refer to a mode where the indoor unit 100 operates by a temperature, a direction and a speed of the air input by a user in a turned-on mode without selecting a plurality of pre-stored modes.

The sleep mode may refer to a mode for setting the indoor unit 100 to operate according to a predetermined algorithm while a user gets into sleep. For convenience of explanation, in this specification, the normal mode will be referred to as a first mode, and the sleep mode will be referred to as a second mode. The operation mode may be changed upon user's selection. For example, a user may change a mode to the sleep mode before getting into sleep, or if a predetermined bed time begins, a mode of the indoor unit 100 may be automatically changed to the sleep mode.

The indoor unit 100 may adopt an air conditioning system using buoyancy of the air for air conditioning. Specifically, if an open and close unit (not shown) provided in the indoor unit 100 is closed, the indoor unit 100 may control an indoor temperature based on temperature stratification where cool air discharged at a low speed is laid on the lowermost layer of the air conditioning area and the air at a higher temperature than the discharged cool air is laid on the top of the cool air due to buoyancy, instead of controlling a temperature by circulating airflow. The above feature may be referred to as a no-wind mode. If the open and close unit (not shown) provided in the indoor unit 100 is open, an air conditioning method based on air circulation may be used, and this feature may be referred to as a wind mode.

One or more of compatible mode(s) may be selected for the indoor unit 100, for example, the wind mode or the no-wind mode may be selected along with the normal mode, and the wind mode or the no-wind mode may be selected along with the sleep mode. In other words, the operation mode may be classified into a normal-wind mode, a normal-no wind mode, a sleep-wind mode, a sleep-no wind mode, or the like.

In response to operating in the sleep mode, the indoor unit 100 may adjust a height of an air conditioning area by adding a temperature correction coefficient to a measured indoor temperature. The temperature correction coefficient may be for compensating a difference between a temperature sensed by the indoor unit 100 and a temperature of a target height. The target height may refer to a height at which a user gets into sleep and be determined in different values according to the sleep types of the user. For example, the temperature correction coefficient may be determined in different values for two cases, whether a user gets into sleep with/without bed. In addition, although the user gets into sleep in the bed, the temperature correction coefficient may be determined in different values according to a height of the bed. The target height may be determined based on a user's input.

In other words, the temperature correction coefficient may be for compensating a difference between a temperature at a height of a temperature sensor provided in the indoor unit 100 and a temperature at a height of a bed where a user gets into sleep. For example, the coefficient correction coefficient may have a value in a rage from −4° C. to 0° C. If assuming that the temperature correction coefficient is −1° C., the indoor unit 100 may determine an indoor unit temperature by adding −1° C. to the measured indoor temperature. As a result, when the indoor unit 100 operates in the sleep mode, energy consumption may be reduced by lowering a height of an air conditioning area where temperature stratification is formed. The above temperature correction coefficient may be an example of a coefficient for correcting a temperature in an adding and subtracting method, but the temperature correction coefficient is not limited thereto.

The indoor unit 100 may change a temperature correction coefficient by stages. For example, since temperature stratification may not be sufficiently formed immediately after the indoor unit 100 enters the sleep mode, the temperature correction coefficient may be set to be small and gradually increased by stages to end up large by the time the temperature stratification is sufficiently formed after a long period of time elapses. By changing a temperature correction coefficient by stages, the indoor unit 100 may reach a set temperature more quickly, and the temperature stratification may remain the same for a long period of time, thereby reducing power consumption.

The indoor unit 100 may transmit information of an operation command for a compressor included in the outdoor unit 200 to the outdoor unit 200 or receive the operation information of the compressor from the outdoor unit 200. The operation information may refer to information for informing an operation state of the compressor. The indoor unit 100 may determine whether the compressor operates based on the operation information.

Specifically, in response to operating in the sleep mode, the indoor unit 100 may transmit the operation command for the compressor to the outdoor unit 200 to provide cool air at a lower temperature than cool air provided in the normal mode. The indoor unit 100, in the case where a difference between a measured temperature in the normal mode and a set temperature is the same as a difference between a correction temperature in the sleep mode and the set temperature, in the sleep mode, may transmit the operation command for the compressor to the outdoor unit 200 to provide cool air at a lower temperature than the cool air provided in the normal mode. By discharging cool air at a lower temperature in the sleep mode, a concentrated air conditioning height may be lowered and the temperature stratification may remain the same for a long period of time.

In response to the compressor of the outdoor unit 220 operating, the indoor unit 100 may discharge air at a higher flow rate, and in response to the compressor of the outdoor unit 200 not operating, the indoor unit 100 may discharge air at a lower flow rate, thereby maintaining the temperature stratification for a long period of time.

Depending on the difference between the measured indoor temperature and the set temperature, the indoor unit 100 may increase a flow rate of the discharged air if a width of a temperature to be lowered is large and reduce the flow rate of the discharged air if the width of a temperature to be lowered is small. The width of the temperature to be lowered may refer to a difference between the correct temperature and the set temperature. For example, if a value obtained by subtracting the set temperature from the corrected temperature is greater than a predetermined value, the indoor unit 100 may determine that the temperature to be lowered is large and increase a flow rate of the discharged air. If a value obtained by subtracting the set temperature from the corrected temperature is smaller than the predetermined value, the indoor unit 100 may determine the width of the temperature to be lowered is small and reduce the flow rate of the discharged air. The set temperature may be a temperature which is set based on a pre-stored sleep algorithm. The sleep algorithm may include a set temperature which varies depending on a predetermined period. Varying set temperature may prevent the compressor of the outdoor unit 200 being turned off since the indoor temperature becomes lower than the set temperature due to the sudden drop of temperature, thereby reducing unnecessary power consumption which required for turning on a turned-off compressor.

The outdoor unit 200 may exchange heat with outdoor air. Specifically, the outdoor unit 200 may exchange heat with the outdoor air through a cooling cycle of discharging heat transmitted from the outdoor unit 100 through a refrigerant to an outside, or a heating cycle of absorbing heat of which a refrigerant is deprived from the outside.

It is shown and described that the indoor unit 100 is a stand type, but when embodying an actual indoor unit, the indoor unit 100 may be a wall-mounted type, a ceiling type, a duct type or a floor type.

Figure 2:
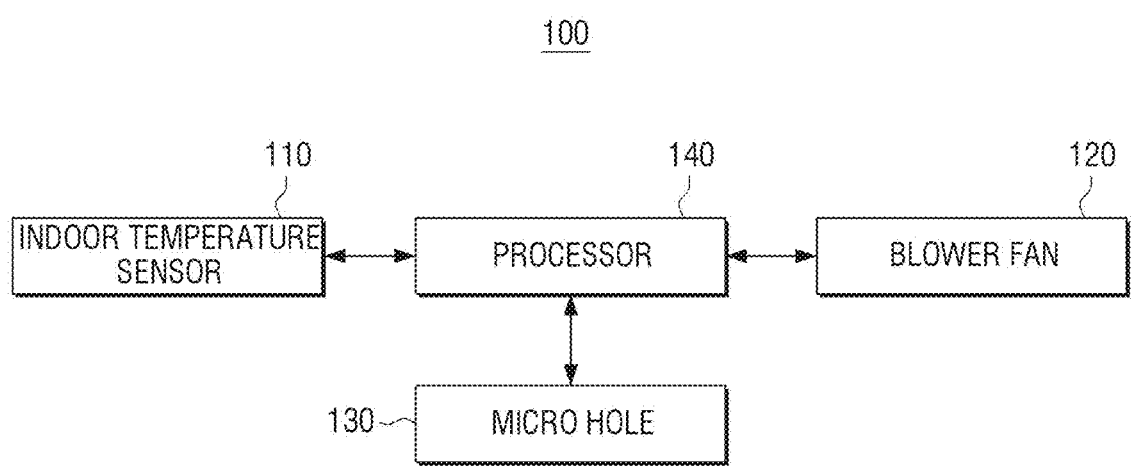
FIG. 2 is a block diagram illustrating schematic configuration of an indoor unit according to an exemplary embodiment of the present disclosure.

FIG. 2 is a block diagram illustrating schematic configuration of an indoor unit according to an exemplary embodiment of the present disclosure.

Referring to FIG. 2, the indoor unit 100 may include a temperature sensor 110, a micro-hole 130, a blower fan 120 and a processor 140.

The temperature sensor 100 may sense an indoor temperature. Specifically, the temperature sensor 110 may sense a temperature of where the indoor unit 100 is arranged using a temperature sensor. The temperature sensor 110 may sense a temperature of where the indoor unit 100 is arranged based on the sensed temperature. Therefore, the temperature sensor 110 may be referred to as an 'indoor temperature sensor 110'.

The blower fan 120 may provide cool air generated by the indoor unit 100 to a plurality of micro-holes 130.

The micro-hole 130 may be configured to discharge cool air flowed in from the blower fan 120 to an inside at a predetermined flow rate or less. Being flowed in from by the blower fan 120 may refer to delivering the cool air generated by the indoor unit 100 to the micro-hole 130 through the blower fan 120. Specifically, the micro-hole 130 may have a diameter of 1 mm or less. The micro-hole 130 provided in the indoor unit 100 may include a plurality of micro-holes at the number between 100,000 to 150,000. Preferably, the micro-hole 130 may include 135000 of micro-holes. A flower rate of cool air flowing through from the micro-hole 130 may be 0.25 m/s or less, preferably 0.15 m/s, and the discharged cool air may be difficult for a user to feel 'wind'. Thus, it may be referred to 'no-wind' or 'breeze'.

Figure 3:
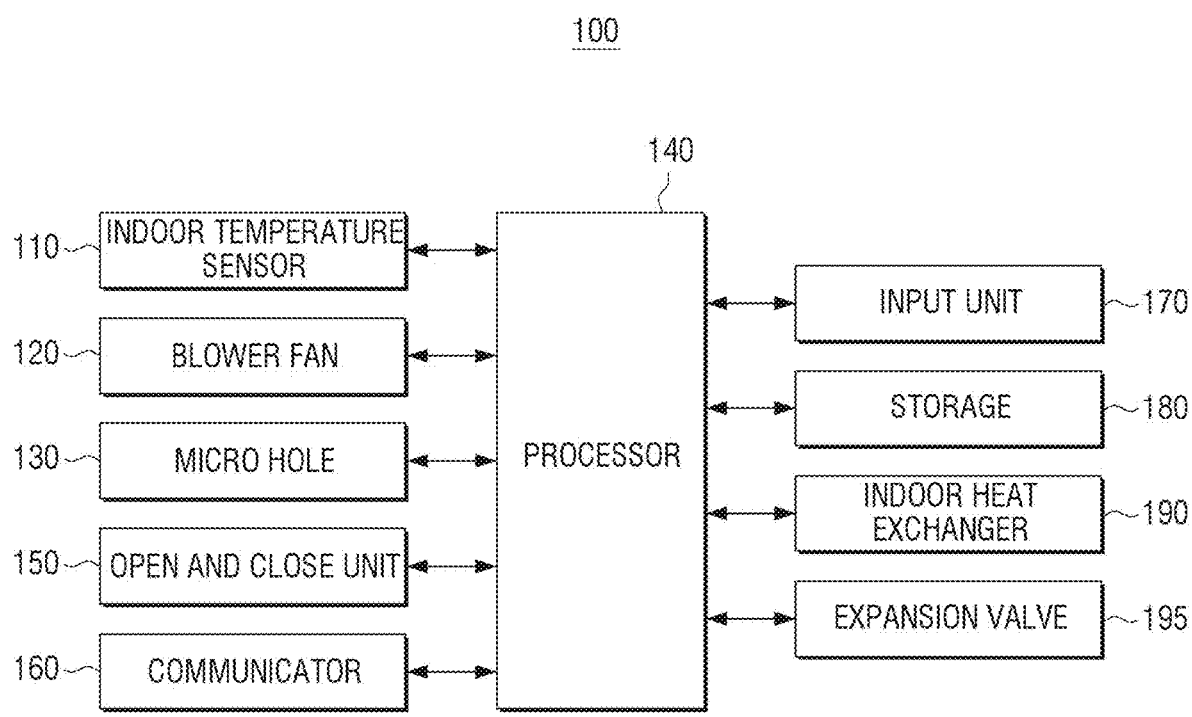
FIG. 3 is a block diagram illustrating specific configuration of the indoor unit of FIG. 2.

The micro-hole 130 may be arranged in an open and close unit (shown in FIG. 3). Therefore, when the open and close unit is closed, the cool air flowed in from the blower fan 120 may be discharged through the micro-hole 130 arranged in the open and close unit. When the open and close unit is open, the cool air flowed in from the blower fan 120 may be discharged without the micro-hole 130.

The processor 140 may control each element of the indoor unit 100. Specifically, the processor 140 may control each element according to an operation mode of the indoor unit 100.

The processor 140 may control a rotation speed of the blower fan 120. Specifically, the processor 140, in response to the indoor unit 100 operating in a normal mode, may control the rotation speed of the blower fan 120 based on the indoor temperature sensed by the indoor temperature sensor 110. Specifically, the processor 140 may reduce the rotation speed of the blower fan 120 if the sensed indoor temperature reaches a set temperature or if the sensed indoor temperature is lower than the set temperature, and determine the rotation speed of the blower fan 120 according to a temperature difference if the sensed indoor temperature is higher than the set temperature. For example, as a difference between the sensed indoor temperature and the set temperature increases, the rotation speed of the blower fan 120 may increase.

The normal mode may refer to a mode where the indoor unit 100 operates by a temperature, a wind direction and a wind speed input by a user while the indoor unit 100 is turned on without selecting a plurality of pre-stored modes. The normal mode may be provided along with a wind mode that uses air circulation, or a no-wind mode that uses the temperature stratification due to the stagnation of airflow.

The set temperature may be a preferable temperature input by the user, or may be based on an algorithm included in each of the plurality of pre-stored modes. Specifically, in response to the indoor unit 100 operating in a sleep mode, the set temperature may vary depending on a predetermined period of time. In response to the indoor unit 100 operating in the sleep mode, the changed set temperature may be based on a pre-stored sleep algorithm. The set temperature varying depending on a sleep algorithm may be described in detail with reference to FIGS. 7 to 9.

The processor 140, in response to the indoor unit 100 operating in the sleep mode, may reflect a temperature correction coefficient into the indoor temperature sensed by the indoor temperature sensor 110, correct the sensed temperature and control the rotation speed of the blower fan 120 based on the corrected temperature.

To be specific, in response to the indoor unit 100 operating in the sleep mode, it is unnecessary to control a temperature of the area above the bed since a user stays between the bottom and the bed height. Therefore, in response to the indoor unit 100 operating in the sleep mode, the processor 140 may calculate a correction temperature by reflecting a temperature correction coefficient although the temperature sensed by the indoor temperature sensor 110 is the same as a temperature in a normal mode, compare the calculated correction temperature with a set temperature and reduce the rotation speed of the blower fan 120. For example, if a temperature correction coefficient is −1° C., a set temperature is 26° C. and a temperature sensed by the indoor temperature sensor 110 is 26.5° C., in the normal mode, the outdoor unit 200 may operate to reduce the temperature of cool air and the blower fan 120 may rapidly rotate. However, in a sleep mode, it is assumed that a temperature of a target height is 25.5° C. by correcting the sensed temperature, and the blower fan 120 may be controlled to slowly rotate to stop the operation of the outdoor unit 200 and maintain the temperature stratification for a long period of time. The temperature correction coefficient may have a value in a range from −4° C. to 0° C. and the value may be determined based on an inside area and the number and size of loads, or the like. Specifically, the temperature correction coefficient may vary depending on a form of the indoor unit 100, i.e. a height of where the indoor temperature sensor 110 is arranged. For example, in the case where the indoor unit 100 is a stand type, a temperature correction coefficient may have a value in a range from −1° C. to 0° C., in the case where the indoor unit 100 is a wall-mounted type, a temperature correction coefficient may have a value in a range from −2° C. to 0° C., and in the case where the indoor unit 100 is a ceiling type, a temperature correction coefficient may have a value in a range from −4° C. to 0° C.

The temperature correction coefficient is not limited to this and may be a ratio or a positive number. For example, if the temperature correction coefficient is a ratio, the processor 140 may obtain the value of a correction temperature by multiplying the sensed indoor temperature by the temperature correction coefficient, and if the temperature correction coefficient is positive, the correction temperature may be obtained by subtracting the temperature correction coefficient from the sensed indoor temperature.

Therefore, in response to the indoor unit 100 operating in the sleep mode, the height of the concentrated air-conditioning area may be lowered to reduce unnecessary energy consumption by determining an indoor temperature by reflecting a temperature correction coefficient to a sensed indoor temperature.

FIG. 3 is a block diagram illustrating specific configuration of the indoor unit of FIG. 2.

Referring to FIG. 3, an indoor unit 100 may include an indoor temperature sensor 110, a blower fan 120, a micro-hole 130, an open and close unit 150, a communicator 160, an input unit 170, a storage 180, an indoor heat exchanger 190, an expansion valve 195 and a processor 140.

The operations of the indoor temperature sensor 110, the blower fan 120 and the micro-hole 130 have been described with reference to FIG. 2, the repetition will be omitted.

The open and close unit 150 may be configured to be selectively opened and closed. The open and close unit 150 may be arranged in a cool air outlet provided at an end of a path that discharges cool air. The open and close unit 150 may include a cover (not shown) which blocks the cool air outlet and a driver (not shown) which drives the cover. A plurality of micro-holes may be arranged to be spaced apart from one another on the cover. In an embodiment, an open state of the open and close unit 150 may indicate that the cover blocking the cool air outlet is open and a closed state of the open and close unit 150 may indicate that the cover is closed and the cool air outlet is blocked. In a wind mode, the open and close unit 150 may be open and the cool air provided by the blower fan 120 may be discharged to an outside. In a no-wind mode, the open and close unit 150 may be closed and the cool air provided by the blower fan 120 may be discharged at a predetermined flow rate or less through the plurality of micro-holes 130. The predetermined flow rate may be 0.25 m/s or less, preferably 0.15 m/s or less.

The wind mode may refer to a mode where the open and close unit 15 of the indoor unit 100 is open and the cool air provided by the blower fan 120 is discharged to the outside at a predetermined flow rate or more, so that a user feels cool air discharged from the indoor unit 100 as 'wind'. The no-wind mode may refer to a mode where the open and close unit 15 of the indoor unit 100 is closed and the cool air provide by the blower fan 120 is discharged through the micro-holes 130, so that the user does not recognize the cool air discharged from the indoor unit 100 as 'wind'.

The communicator 160 may receive operation information of a compressor included in an outdoor unit. The communicator 160 may transmit an operation command for the compressor to the outdoor unit based on an indoor temperature sensed by the indoor temperature sensor 110 and a set temperature. In response to the indoor unit 100 operating in a sleep mode, the communicator 160 may transmit the operation command for the compressor to the outdoor unit based on a correction temperature calculated by reflecting a temperature correction coefficient into the sensed indoor temperature and a set temperature. For convenience of explanation, the sensed indoor temperature and the correction temperature calculated by reflecting the temperature correction coefficient may be referred to as an indoor temperature.

The communicator 160 may transmit information on the indoor temperature and the set temperature to the outdoor unit along with the operation command for the compressor or transmit only the information on the indoor temperature and the set temperature to the outdoor unit, so that the outdoor unit controls the compressor based on the transmitted indoor temperature and the set temperature.

Specifically, the communicator 160, in response to the indoor unit 100 operating in the sleep mode, may transmit the operation command for the compressor to the outdoor unit to provide cool air at a lower temperature than cool air in a normal mode. If a difference between the indoor temperature sensed when the indoor unit 100 operates in a normal mode and a set temperature is the same as a difference between a correction temperature when the indoor unit 100 operates in a sleep mode and a set temperature, in the sleep mode, the communicator 160 may transmit the operation command for the compressor to the outdoor unit to provide the cool air at a lower temperature than the cool air in the normal mode. Therefore, cool air at a lower temperature may be discharged in a sleep mode, thereby lowering a height of concentrated air conditioning area and maintaining temperature stratification for a long period of time.

The communicator 160 may be configured in a form of a port connecting the indoor unit 100 with an outdoor unit (not shown) and a cable, performing communication with a control terminal device through a local area network (LAN) and the Internet network, performing communication through a Universal Serial Bus (USB) port, or a wireless port. The communicator 160 may perform communication according to standards Near Field Communication (NFC)

such as WiFi, Bluetooth, Zigbee, IrDA, RF such as UHF, VHF, Ultra Wide Band (UWB) communication, etc.

The input unit 170 may provide an interface through which a user sets or selects various functions supported by the indoor unit 100. Specifically, the input unit 170 may include a button for allowing the indoor unit 100 to operate in one of a cooling operation, a heating operation, a blowing operation, a dehumidifying operation, an automatic operation and a sleeping operation. In addition, the input unit 170 may include an up and down button for inputting a set temperature corresponding to a set operation mode or an intensity of the discharged air.

The input unit 170 may display various information provided by the indoor unit 100. Specifically, the input unit 170 may display an operation mode, a temperature and an air volume, which are set to the indoor unit 170, and further display a currently sensed indoor temperature, a scheduled time at which current air conditioning is ended, a scheduled time at which air conditioning is to be started, or the like. The input unit 170 may be embodied as a device in which both an input and an output are available such as a touch screen, etc., or embodied in a form including a button key for input pressing and a display device on which an air conditioning state is displayed.

The storage 180 may store various programs for performing a function of an air conditioner. Specifically, the storage 180 may store a temperature control algorithm according to a plurality of modes. The temperature control algorithm may include change of a set temperature, an intensity of air, a direction of air, etc. according to a predetermined period for each mode.

Figure 7:
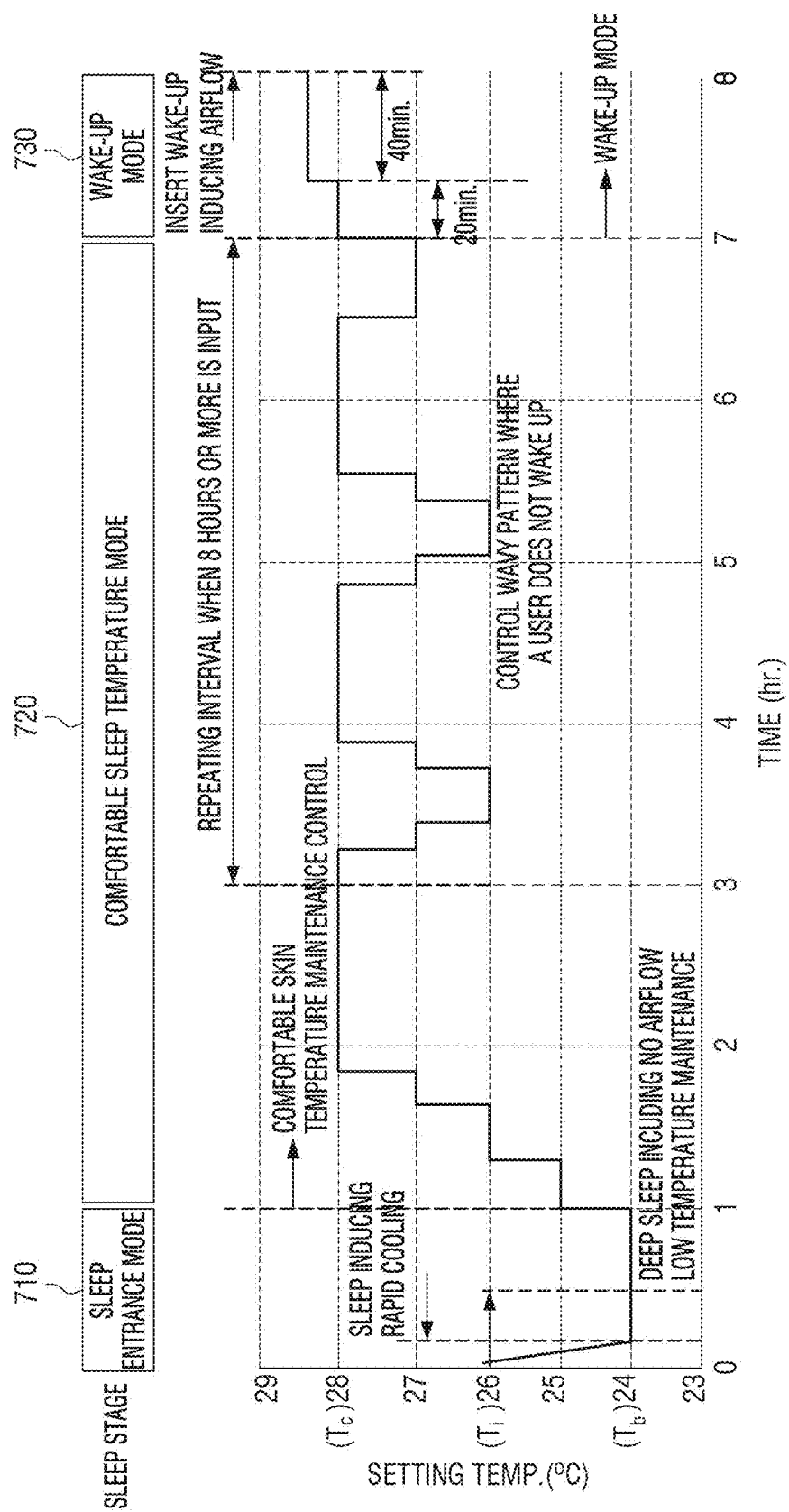
FIG. 7 is a view provided to explain a sleep algorithm applied to an air conditioning system according to an exemplary embodiment of the present disclosure.

For example, a sleep algorithm included in a sleep mode may have a cycle of 8 (eight) hours, as shown in FIG. 7, a mode may be separated into a sleep entrance mode, a comfortable sleep temperature mode and a wake-up mode, and a set temperature may be changed according to a time. If a user inputs a desired temperature through the input unit 170, the set temperature may vary depending on the input desired temperature, but a temperature change pattern may be the same.

The indoor heat exchanger 190 may exchange heat between the air flowed in from the indoor unit 100 and a refrigerant provided from an outdoor unit. Specifically, the indoor heat exchanger 190 may function as an evaporator during cooling. In other words, the indoor heat exchanger 190 may absorb latent heat required for phase transition in which a refrigerant in fog condition at a low-pressure and a low-temperature evaporates into gas from the air flowing into the indoor unit 100. Conversely, the indoor heat exchanger 190 may serve as a condenser during heating. In other words, when the refrigerant is reversely flowed as opposed to the case of the cooling, the heat of the refrigerant passing through the indoor heat exchanger 190 may be discharged to the air flowing into the indoor unit 100.

The expansion valve 195 may adjust a pressure of a refrigerant. Specifically, the expansion valve 195 may reduce a pressure by expanding a refrigerant at a high pressor and a lower temperature, which have passes through an outdoor heat exchanger during cooling. In addition, the expansion valve 195 may adjust the amount of refrigerants flowing into the indoor heat exchanger 190. Conversely, the expansion valve 195 may reduce a pressure by expanding a refrigerant at a lower pressure and a high temperature before transmitting a refrigerant having passed through the indoor heat exchanger 190 to the outdoor heat exchanger. In addition, the expansion valve 195 may adjust the amount of refrigerants flowing into the outdoor heat exchanger.

The processor 140 may read programs, etc. stored in the storage 180. Specifically, the processor 140 may read programs including a series of readable commands for performing a function of an air conditioner and perform air conditioning.

The processor 140 may sense whether air conditioning is being properly performed by sensing a pressure and/or a temperature of a refrigerant in the indoor heat exchanger 190. For example, the processor 140 may sense whether a pipe of the indoor heat exchanger 190 is damaged, whether there is frost in the pipe, or whether water generated by condensing vapor in the air is being appropriately removed.

The processor 140 may control a speed of the blower fan 120. Specifically, the processor 140 may control a rotation speed of the blower fan 120 according to an indoor temperature sensed by the indoor temperature sensor 110 and a set temperature. In response to the indoor unit 100 operating in a sleep mode, the processor 140 may control the rotation speed of the blower fan 120 according to a correction temperature calculated by reflecting a temperature correction coefficient into the sensed indoor temperature and a set temperature.

Specifically, the pressor 140 may control the speed of the blower fan 120 according to a difference between an indoor temperature and a set temperature. For example, if a different between the indoor temperature and the set temperature is large, the processor 140 may increase the rotation speed of the blower fan 120 to quickly reach the set temperature, and if a difference between the indoor temperature and the set temperature is small, or the indoor temperature reaches the set temperature, the processor 140 may reduce the rotation speed of the blower fan 120 so that the compressor of the outdoor unit may not be turned off due to the lowered indoor temperature. The processor 140 may control the rotation speed of the blower fan 120 in a range from 500 RPM to 900 RPM.

The processor 140, in response to the indoor unit 100 operating in the sleep mode, may transmit the operation command for the compressor to the outdoor unit 200 for providing cool air at a lower temperature than cool air in the normal mode through the communicator 160. The processor 140, if a difference between the indoor temperature sensed when the indoor unit 100 operates in the normal mode and a set temperature is the same as a difference between a correction temperature in the sleep mode and the set temperature, in the sleep mode, may transmit the operation command for the compressor for providing cool air at a lower temperature than the cool air in the normal mode. Therefore, the cool air at a lower temperature may be discharged in the sleep mode, thereby lowering a height of a concentrated air conditioning area and maintaining temperature stratification for a long period of time.

The processor 140 may determine the rotation speed of the blower fan 120 according to whether the compressor included in the outdoor unit 200 operates or not. Specifically, the processor 140 may determine the rotation speed of the blower fan 120 based on the operation information of the compressor, which is received through the communicator 160. For example, if the compressor included in the outdoor unit 200 operates, the indoor unit 100 may increase the rotation speed of the blower fan 120 to receive a refrigerant compressed by the outdoor unit 200 and quickly deliver cool air generated by the compressed refrigerant to an indoor air conditioning area. Conversely, if the compressor of the outdoor 200 unit stops operation, the indoor unit 100 may turn off the blower fan 120 to maintain the temperature stratification generated in the air conditioning area for a long period of time or reduce the rotation speed of the blower fan 120 so that air circulation may not occur. If an indoor temperature is a predetermined temperature or less, the operation of the compressor may stop. The predetermined temperature may refer to a temperature lower than a set temperature by a predetermined value. It will be described in detail with reference to FIGS. 8 and 9.

The processor 140 may control the amount of refrigerants passing through the expansion valve 195. Specifically, if the expansion valve 195 is embodied as a vibration expansion valve, the processor 140 may control a degree of heat exchanging in the indoor heat exchanger 190 by adjusting the amount of refrigerants of the expansion valve 195.

The processor 140 may control activation of the indoor temperature sensor 110 and measure a temperature of an inside by receiving the indoor temperature sensed by the indoor temperature sensor 110. Specifically, the processor 140 may activate the indoor temperature sensor 110 to obtain information of the indoor temperature as feedback information during cool and heating and receive the indoor temperature sensed by the indoor temperature sensor 110. The processor 140 may inactivate the indoor temperature sensor 110 during a blower operation, where there is no need to know an indoor temperature.

As describe above, by controlling the rotation speed of the blower fan 120 according to a difference between an indoor temperature and a set temperature, a temperature of an air conditioning area may be lowered in a short period of time, and if the temperature of the air conditioning area is close to the set temperature, by maintaining temperature stratification generated in the air conditioning area with a lower speed of the blower fan 120 and preventing a compressor of an outdoor unit being turned off, energy consumed for re-operating the compressor may be reduced.

Figure 4:
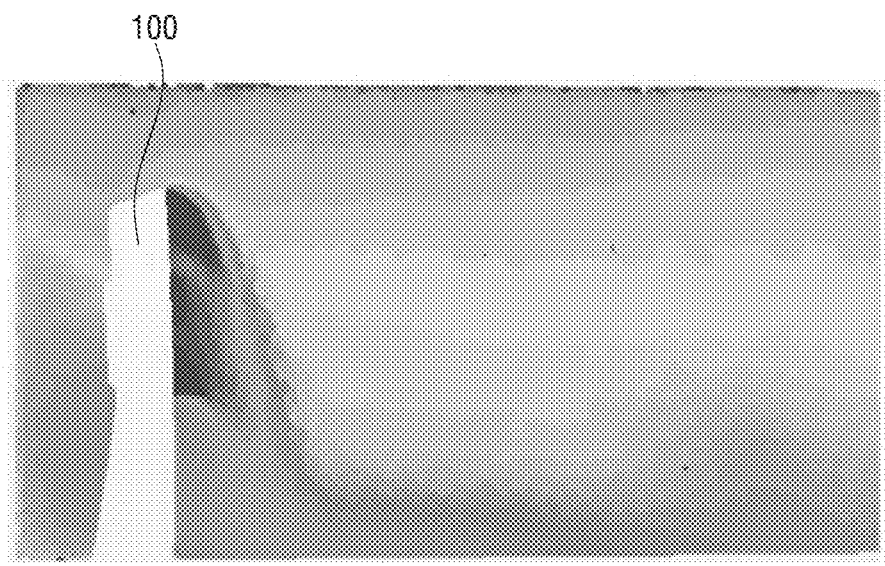
FIG. 4 is a view illustrating temperature distribution of an air conditioning system according to an exemplary embodiment of the present disclosure.

FIG. 4 is a view illustrating temperature distribution of an air conditioning system according to an exemplary embodiment of the present disclosure.

Referring to FIG. 4, an air conditioning system according to an embodiment of the present disclosure is a system where temperature stratification from the bottom to the top of the inside area is formed. The temperature stratification may be formed when the cool air discharged by the indoor unit 100 at a lower speed in a no-wind mode is laid on the lowermost layer of the area and gradually and upwardly pushes the air at a higher temperature than the discharged cool air.

Figure 5:
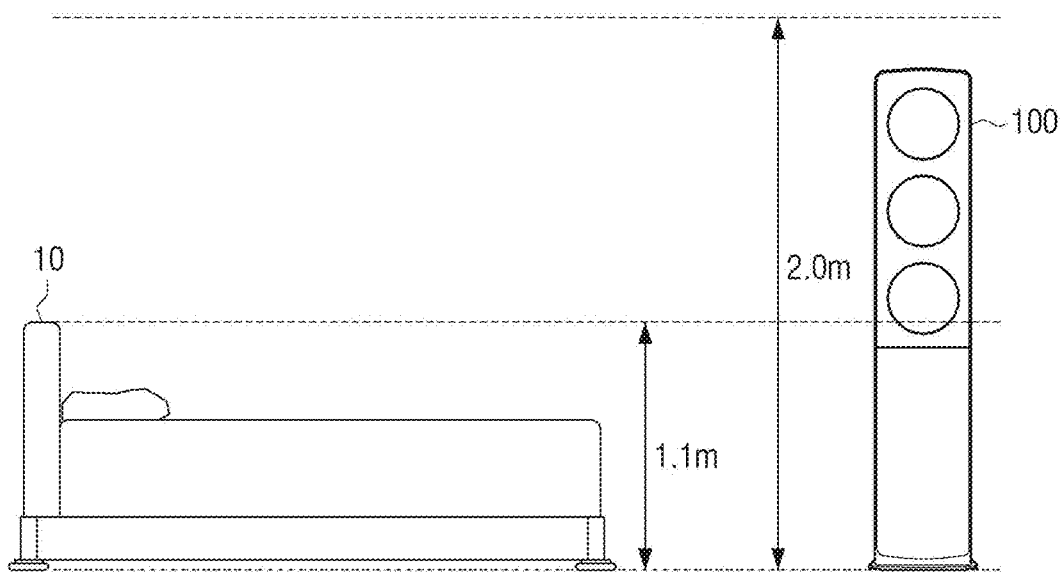
FIG. 5 is a view provided to explain an air conditioning area of an air conditioning system according to an exemplary embodiment of the present disclosure.

As shown in FIG. 4, according to an air conditioning system according to an embodiment of the present disclosure, a temperature may increase as a height in the air conditioning area increases, in response to the indoor unit 100 operating in the sleep operation mode, as shown in FIG. 5, if a temperature at a low height in the area is controlled according to a set temperature, unnecessary consumed energy will be reduced.

FIG. 5 is a view provided to explain an air conditioning area of an air conditioning system according to an exemplary embodiment of the present disclosure.

Referring to FIG. 5, in response to the indoor unit 100 operating in a normal mode, the indoor unit 100 may set an area at a height between 0 m and about 2.0 m, where users mostly stay, as a concentrated air conditioning area on the basis of a bottom surface (h=0 m) of the inside area. The concentrated air conditioning area may refer to an area where a difference between a highest temperature and a lowest temperature maintains within 3° C. on the basis of a set temperature.

In response to the indoor unit 100 operating in a sleep mode, since the users may mostly stay on bottom surface or at a height of a bed 10, the indoor unit 100 may set an area at a height between 0 m and about 1.1 m as a concentrated air conditioning area.

Specifically, the indoor unit 100 may determine an indoor temperature by adding a temperature correction coefficient to an indoor temperature sensed by an indoor temperature sensor (not shown) and adjust a height of the concentrated air conditioning area. The temperature correction temperature may have a value in a range from −1° C. to 0° C. In the case where the indoor unit 100 is a wall-mounted type close to a ceiling, as a distance between the indoor temperature sensor and the bottom surface increases, the temperature correction coefficient may be −1° C. or less. In addition, in the case where the air conditioning area is large or the number and size of loads that prevent cool air from being discharged or dissipate heat are large such as the cases of furniture, electric heater, etc., the temperature correction coefficient may be −1° C. or less.

In an air conditioning system according to an embodiment, temperature stratification may be generated by discharging cool air at a lower speed, if a set temperature is 26° C., a temperature sensed by the indoor temperature sensor when a height of the concentrated air conditioning area ranges from 0 m to about 1.1 m may be greater than a temperature sensed by the indoor temperature sensor at the same position when a height of the concentrated air conditioning area ranges from 0 m to about 2.0 m.

Therefore, the indoor unit 100 may determine an indoor temperature by adding a temperature correction coefficient to the sensed indoor temperature and reduce unnecessary energy consumption by lowering a height of the concentrated air conditioning area.

In FIG. 5, a height of the concentrated air conditioning area may range from 0 m to about 1.1 m with reference to a usual bed height, but when embodying a virtual indoor unit, the height of the concentrated air conditioning area may be set to less than 1.1 m or more than 1.1 m by adjusting a temperature correction coefficient based on a height of where a user gets into sleep.

Figure 6:
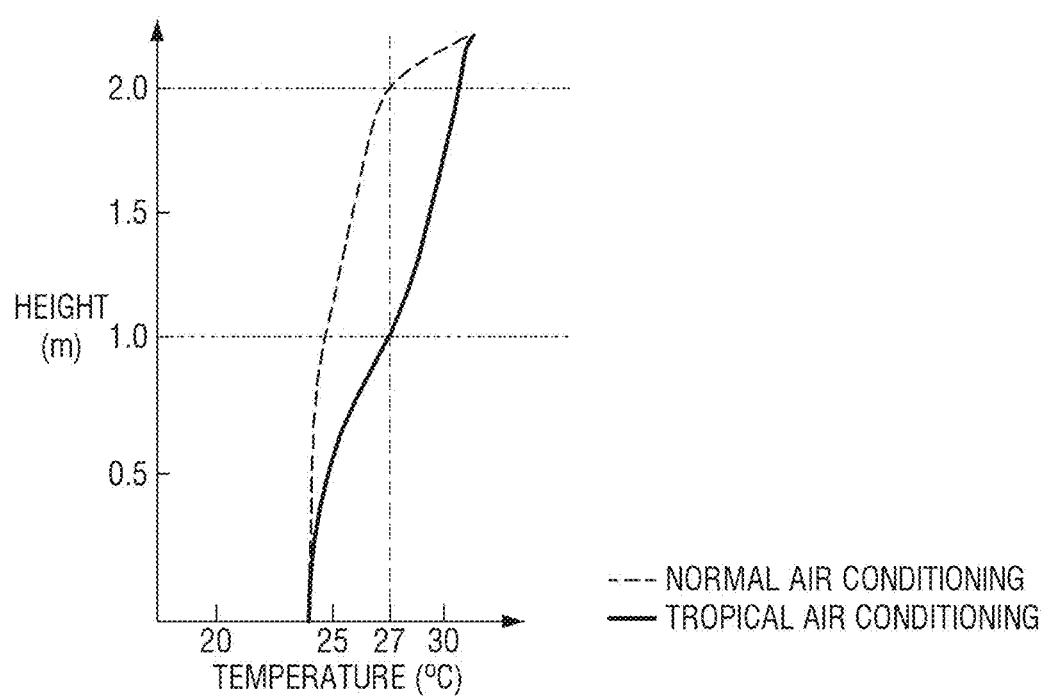
FIG. 6 is a graph provided to explain a temperature change according to a height of the air conditioning area of FIG. 5.

FIG. 6 is a graph provided to explain a temperature change according to a height of the air conditioning area of FIG. 5. Specifically, FIG. 6 is a graph showing a temperature change according to a height of an inside if a set temperature is 26° C. In FIG. 6, 'tropical air-conditioning' may indicate that indoor unit 100 operates in a sleep mode.

Referring to FIG. 6, it is confirmed that both in a normal air conditioning mode and in a tropical air conditioning mode, a temperature may sequentially increase as a height of where a use gets into sleep increases due to temperature stratification generated by an air conditioning system.

In the normal air conditioning mode, a temperature may be controlled so that a temperature variation is within about 3° C. in an area between the bottom surface of 0 m to about 2 m height, but in the tropical air conditioning mode, a temperature may be controlled so that a temperature variation is within about 3° C. in an area between the bottom surface to about 1 m height.

Due to the above, if a temperature is sensed at the same height, a temperature may be sensed to be higher in the tropical air conditioning mode than in the normal air conditioning mode. However, a set temperature may be sufficiently embodied at a height of where a user gets into sleep (below 1 m height). According to an air conditioning system according to an embodiment of the present disclosure, in the case of the tropical air conditioning mode for a concentrated air conditioning area at low height, a value obtained by adding a temperature correction coefficient to the temperature sensed by the indoor temperature sensor of the indoor unit is determined to be an indoor temperature for controlling a temperature according to a set temperature of a sleep algorithm as shown in FIG. 7.

Therefore, according to an embodiment of the present disclosure, unnecessary energy consumption may be reduced without controlling a temperature for an area above where a user gets into sleep.

FIG. 7 is a view provided to explain a sleep algorithm applied to an air conditioning system according to an exemplary embodiment of the present disclosure.

Referring to FIG. 7, the sleep algorithm may include a sleep entrance mode 710, a comfortable sleep temperature mode 720 and a wake-up mode 730.

Specifically, an indoor unit of the present disclosure may control the operation of a compressor, etc. of an outdoor unit for performing a sleep operation according to the present disclosure if a command for operating in a sleep mode is received. According to an embodiment of the present disclosure, the indoor unit may be controlled to operate in the sleep entrance mode 710 for operating at a lowest temperature Tb lower than a desired temperature Ti if the desired temperature Ti and a sleep mode are input by a user, in the comfortable sleep temperature mode 720 for operating between a comfortable sleep temperature Tc, which is increased from the lowest temperature Tb and higher than the desired temperature Ti, and the desired temperature Ti, and in the wake-up mode 730 for operating at a wake-up temperature higher than the comfortable sleep temperature Tc.

For example, if a sleep mode is input, a sleep operation time may be set. According to an embodiment of the present disclosure, the sleep operation time may be set to 8 (eight) hours. The indoor unit, during the sleep mode, may set a set temperature to the lowest temperature Tb and control to operate in the sleep entrance mode 710 for 1 (one) hour. If the operating time of sleep entrance mode 710 elapses, the indoor unit may set a set temperature to increase to the comfortable sleep temperature Tc higher than the lowest temperature Tb by 4° C. If the set temperature reaches the comfortable sleep temperature Tc, the indoor unit may control to operate in the comfortable sleep temperature mode 720 between the comfortable sleep temperature Tc and the desired temperature Ti before reaching the wake-up mode 730. If the sleep operation time has 1 (one) hour left, the indoor unit may control to operate in the wake-up mode 730 for 1 (one) hour at the temperature higher than the comfortable sleep temperature Tc by 0.5° C.

The indoor unit may control to operate at the set temperature of the lowest temperature Tb, which is lower than the desired temperature Ti by 2° C. when operating in the sleep entrance mode 710 on the basis of the desired temperature Ti input by a user.

Although not shown in the present disclosure, if the input desired temperature is less than 21° C., the indoor unit may set the lowest temperature Tb to 21° C.

An indoor unit of an air conditioning system according to an embodiment of the present disclose may apply a sleep algorithm to a concentrated air conditioning area at a lower height than the concentrated air conditioning area in a normal mode for reducing consumed energy. The method for lowering a height of the concentrated air conditioning area has been described in FIGS. 6 and 7. Thus, the repetition will be omitted.

Figure 8:
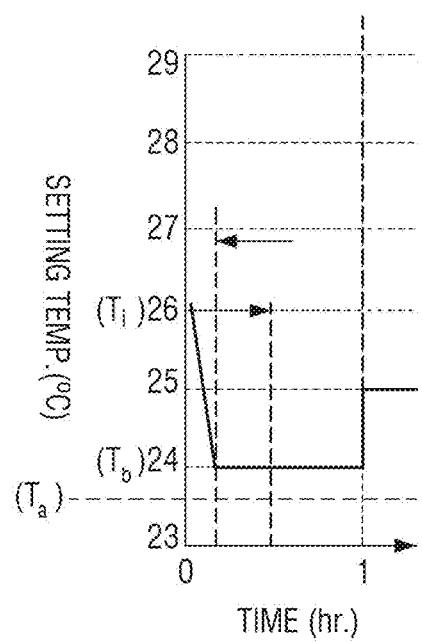
FIG. 8 is a view provided to explain a sleep entrance mode of the sleep algorithm of FIG. 7.

FIG. 8 is a view provided to explain a sleep entrance mode of the sleep algorithm of FIG. 7. Specifically, FIG. 8 shows a change of a set temperature as time elapses assuming that a cycle of a sleep mode is 8 (eight) hours, and the desired temperature Ti is 26° C.

Referring to FIG. 8, if a desired temperature Ti and a sleep mode are input by a user, an indoor unit may operate in the sleep entrance mode 710 at the lowest temperature Tb lower than the desired temperature Ti. Specifically, during the sleep mode, the indoor unit may set a set temperature to the lowest temperature Tb and control to operate in the sleep entrance mode 710 for 1 (one) hour.

The indoor unit may discharge cool air generated by rotating a blower fan at a high speed to a concentrated air conditioning area within a short period of time to swiftly lower an indoor temperature to the lowest temperature Tb.

If the indoor temperature is lower than a compressor stop temperature Ta, a compressor of an outdoor unit may not operate. In this case, unnecessary energy may be consumed for operating the compressor again. Therefore, the indoor unit may reduce a rotation speed of the blower fan which delivers cool air if the indoor temperature is close to the lowest temperature Tb, which is a set temperature, so that the indoor temperature may not drop not to be lowered than the compressor stop temperature Ta.

As describe above, by controlling the rotation speed of the blower fan 120 according to a difference between an indoor temperature and a set temperature, a temperature of an air conditioning area may be lowered in a short period of time, and if the temperature of the air conditioning area is close to the set temperature, by maintaining temperature stratification generated in the air conditioning area with a lower speed of the blower fan 120 and preventing a compressor of an outdoor unit being turned off, energy consumed for operating the compressor may be reduced.

Figure 9:
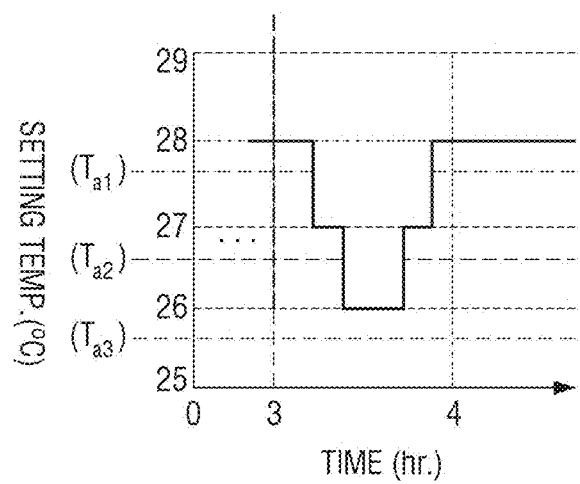
FIG. 9 is a view provided to explain a comfortable sleep temperature mode of the sleep algorithm of FIG. 7.

FIG. 9 is a view provided to explain a comfortable sleep temperature mode of the sleep algorithm of FIG. 7. Specifically, FIG. 9 shows a part of an interval in which a set temperature is repeated in a wavy pattern during a comfortable sleep temperature mode.

Referring to FIG. 9, an indoor unit may operate at a deep sleep temperature of 28° C. higher than the lowest temperature 24° C. by 4° C. after a sleep entrance mode, and if reaching the deep sleep temperature, the indoor unit may operate in comfortable sleep temperature mode to swing between the deep sleep temperature and the desired temperature 26° C. before reaching a wake-up mode.

In the comfortable sleep temperature mode, since a set temperature is changed to a desired temperature to be reduced by 1° C. from the deep sleep temperature two times, the indoor unit may rotate the blower fan at a speed lower than a speed of the blower fan for reaching the lowest temperature shown in FIG. 8.

Therefore, if the indoor temperature is lower than the compressor stop temperatures Ta1, Ta2, Ta3 each corresponding to the set temperature, energy consumption for re-operating the stopped compressor of the outdoor unit may be reduced. Therefore, the indoor unit may rotate the blower fan at a low speed so that the indoor temperature may not swiftly drop to be lowered than the compressor stop temperatures Ta1, Ta2 and Ta3 and may further reduced the rotation speed of the blower fan delivering cool air if the indoor temperature reaches each set temperature.

As describe above, by controlling the rotation speed of the blower fan according to a difference between an indoor temperature and a set temperature, a temperature of an air conditioning area may be lowered in a short period of time, and if the temperature of the air conditioning area reaches the set temperature, by maintaining temperature stratification generated in the air conditioning area with a lower speed of the blower fan and preventing a compressor of an outdoor unit being turned off, energy consumed for operating the compressor may be reduced.

Figure 10:
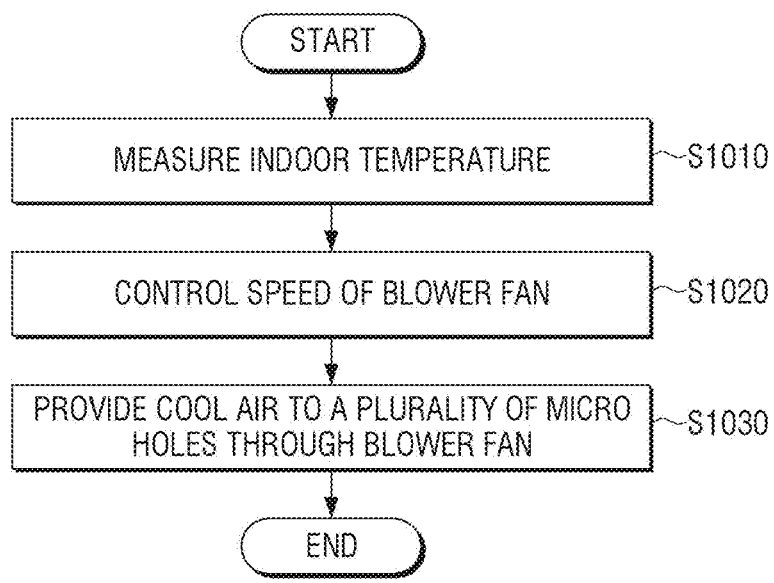
FIG. 10 is a flowchart provided to explain a controlling method of an indoor unit of an air conditioning system according to an exemplary embodiment of the present disclosure.

FIG. 10 is a flowchart provided to explain a controlling method of an indoor unit of an air conditioning system according to an exemplary embodiment of the present disclosure.

An indoor unit may measure an indoor temperature at step S1010. Specifically, the indoor unit may measure a temperature of an indoor area based on the temperature sensed by a provided indoor temperature sensor.

The indoor unit may control a speed of a blower fan at step S1020. Specifically, the indoor unit may control the speed of the blower fan based on an indoor temperature and a set temperature. In more detail, the indoor unit may control the blower fan to rapidly rotate if a difference between the measured indoor temperature and the set temperature is large based on a difference between the indoor temperature and the set temperature, and control the blower fan to slowly rotate if the measured indoor temperature is close to the set temperature or reaches the set temperature.

In response to the indoor unit operating in a normal mode, the indoor unit may control the speed of the blower fan based on the measured indoor temperature and the set temperature and in response to the indoor unit operating in a sleep mode, the indoor unit may control the rotation speed of the blower fan based on the correct temperature calculated by reflecting a temperature correction coefficient to the measured indoor temperature and the set temperature.

The indoor unit may determine the speed of the blower fan according to whether a compressor included in an outdoor unit operates. Specifically, if the compressor operates, the indoor unit may control the blower fan to rapidly rotate and if the compressor stops operating, the indoor unit may control the blower fan to slowly rotate.

The indoor unit may provide cool air to a plurality of micro-holes through the blower fan at step S1030. Specifically, in a no-wind mode where an open and close unit is closed, the indoor unit may provide cool air flowed in from the blower fan to the plurality of micro-holes and discharge the cool air at a speed less than predetermined flow rate through the plurality of micro-holes. In a wind mode where the open and close unit is open, the indoor unit may directly discharge the generated cool air to an outside at a speed more than a predetermined flow rate through the blower fan through the open and close unit in an open state.

As describe above, according to the present disclosure, unnecessary energy consumption may be reduced since a temperature for an area above where a user in her/his sleep, by controlling the rotation speed of the blower fan according to a difference between an indoor temperature and a set temperature, a temperature of an air conditioning area may be lowered in a short period of time, and if the temperature of the air conditioning area is close to the set temperature, by maintaining temperature stratification generated in the air conditioning area with a lower speed of the blower fan 120 and preventing a compressor of an outdoor unit being turned off, energy consumed for re-operating the compressor may be reduced.

Various exemplary embodiments described above may be embodied in a recording medium that may be read by a computer or a similar apparatus to the computer by using software, hardware, or a combination thereof. According to the hardware embodiment, exemplary embodiments that are described in the present disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In some cases, embodiments described herein may be implemented by processor 140 itself. In a software configuration, various embodiments described in the specification such as a procedure and a function may be embodied as separate software modules. The software modules may respectively perform one or more functions and operations described in the present specification.

Methods of controlling a display apparatus according to various exemplary embodiments may be stored on a non-transitory readable medium. The non-transitory readable medium may be installed and used in various devices.

The non-transitory computer readable recording medium refers to a medium that stores data and that can be read by devices. Specifically, programs of performing the above-described various methods can be stored in a non-transitory computer readable medium such as a CD, a DVD, a hard disk, a Blu-ray disk, universal serial bus (USB), a memory card, ROM, or the like, and can be provided.

The foregoing exemplary embodiments and advantages are merely exemplary and are not to be construed as limiting the present disclosure. The present teaching may be readily applied to other types of apparatuses. Also, the description of the exemplary embodiments of the present disclosure is intended to be illustrative, and not to limit the scope of the claims, and many alternatives, modifications, and variations will be apparent to those skilled in the art.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An indoor unit of an air conditioning system, comprising:
   a blower fan;
   a plurality of micro-holes configured to discharge cool air drawn in from the blower fan;
   a temperature sensor configured to measure a temperature; and
   a processor configured to control a speed of the blower fan,
   wherein the processor, in a first mode, controls the speed of the blower fan according to a temperature sensed by the temperature sensor, and in a second mode, corrects the sensed temperature by applying a temperature correction coefficient and controls the speed of the blower fan according to the corrected temperature, and
   wherein the temperature correction coefficient is a coefficient set for compensating a difference between the sensed temperature and a temperature of a target height.

2. The indoor unit as claimed in claim 1, wherein the temperature correction coefficient has a value in a range from −4° C. to 0° C.

3. The indoor unit as claimed in claim 1, further comprising:
   a communicator,
   wherein the processor, in the second mode, transmits an operation command with regard to a compressor to an outdoor unit through the communicator to discharge cool air at a lower temperature than cool air discharged in the first mode.

4. The indoor unit as claimed in claim 1, further comprising:
a cover configured to be selectively opened and closed and to be arranged in a cool air outlet which discharges the cool air drawn in from the blower fan to an outside in an open state,
wherein the processor controls to discharge the cool air drawn in from the blower fan at a predetermined flow rate or less through the plurality of micro-holes by closing the cover in a no-wind mode and to discharge the cool air drawn in from the blower fan to the outside by opening the cover in a wind mode.

5. The indoor unit as claimed in claim 1, wherein the processor adjusts the speed of the blower fan based on a difference between the corrected temperature and a set temperature in the second mode.

6. The indoor unit as claimed in claim 5, wherein the processor changes the set temperature at every predetermined period of time in the second mode.

7. The indoor unit as claimed in claim 1, further comprising:
a communicator configured to receive operation information with regard to a compressor included in an outdoor unit,
wherein the processor increases the speed of the blower fan in response to the compressor operating.

8. A controlling method for an indoor unit of an air conditioning system, the method comprising:
sensing a temperature;
in a first mode, determining a speed of a blower fan according to the sensed temperature, and, in a second mode, applying a temperature correction coefficient, correcting the sensed temperature and determining the speed of the blower fan according to the corrected temperature; and
discharging cool air by driving the blower fan at the determined speed,
wherein the temperature correction coefficient is a coefficient set for compensating a difference between the sensed temperature and a temperature of a target height.

9. The method as claimed in claim 8, wherein the temperature correction coefficient has a value in a range from −4° C. to 0° C.

10. The method as claimed in claim 8, further comprising:
in the second mode, transmitting an operation command for controlling a compressor to an outdoor unit including the compressor to discharge cool air at a lower temperature than cool air discharged in the first mode.

11. The method as claimed in claim 8, wherein the discharging of the cool air comprises:
in a no-wind mode, closing a cover provided in a cool air outlet of the indoor unit and discharging cool air drawn in from the blower fan through a plurality of micro-holes formed in the cover; and
in a wind mode, opening the cover and discharging the cool air drawn in from the blower fan through the cool air outlet.

12. The method as claimed in claim 8, wherein the determining the speed of the blower fan comprises adjusting the speed of the blower fan based on a difference between the corrected temperature and a set temperature in the second mode.

13. The method as claimed in claim 12, wherein the set temperature is changed at every predetermined period of time in the second mode.

14. The method as claimed in claim 8, further comprising:
receiving operation information with regard to a compressor included in an outdoor unit,
wherein the determining of the speed of the blower fan comprises increasing the speed of the blower fan in response to the compressor operating.

15. An air conditioning system, comprising:
an outdoor unit; and
an indoor unit configured to generate cool air by using a refrigerant supplied from the outdoor unit and discharge the generated cool air through a blower fan,
wherein the indoor unit, in a first mode, controls a speed of the blower fan according to a sensed temperature, and in a second mode, applies a temperature correction coefficient, corrects the sensed temperature and controls the speed of the blower fan according to the corrected temperature, and
wherein the temperature correction coefficient is a coefficient set for compensating a difference between the sensed temperature and a temperature of a target height.

16. The air conditioning system as claimed in claim 15, wherein the temperature correction coefficient has a value in a range from −4° C. to 0° C.

17. The air conditioning system as claimed in claim 15, the indoor unit comprising:
a communicator; and
a processor, wherein the processor, in the second mode, transmits an operation command with regard to a compressor to an outdoor unit through the communicator to discharge cool air at a lower temperature than cool air discharged in the first mode.

18. The air conditioning system as claimed in claim 15, the indoor unit further comprising a cover configured to be selectively opened and closed and to be arranged in a cool air outlet which discharges the cool air flowed in from the blower fan to an outside in an open state,
wherein the indoor unit is configured to discharge the cool air drawn in from the blower fan at a predetermined flow rate or less through a plurality of micro-holes by closing the cover in a no-wind mode and to discharge the cool air drawn in from the blower fan to the outside by opening the cover in a wind mode.

19. The indoor unit as claimed in claim 1, wherein the plurality of micro-holes have a diameter of $1_{mm}$ or less.

20. The indoor unit as claimed in claim 1, wherein the plurality of micro-holes comprise a range of between 100,000 to 150,000 holes.

* * * * *